United States Patent
Yamamoto (10) Patent No.: US 7,534,046 B2
(45) Date of Patent: May 19, 2009

(54) WHEEL SUPPORT BEARING ASSEMBLY

(75) Inventor: Ken Yamamoto, Iwata (JP)

(73) Assignee: NTN Corporation, Osaka (JP)

( * ) Notice: Subject to any disclaimer, the term of this patent is extended or adjusted under 35 U.S.C. 154(b) by 547 days.

(21) Appl. No.: 11/208,854

(22) Filed: Aug. 23, 2005

(65) Prior Publication Data
US 2006/0045400 A1 Mar. 2, 2006

(30) Foreign Application Priority Data
Aug. 24, 2004 (JP) ............... 2004-243083

(51) Int. Cl.
*F16C 32/00* (2006.01)
*G01B 7/30* (2006.01)
(52) U.S. Cl. ................ 384/448; 324/207.25
(58) Field of Classification Search ........... 384/448; 324/173, 174, 207.25; 73/514.31, 514.39
See application file for complete search history.

(56) References Cited

U.S. PATENT DOCUMENTS

| | | | | |
|---|---|---|---|---|
| 6,280,093 | B1 * | 8/2001 | Ohtsuki et al. | ............ 384/448 |
| 2001/0030533 | A1 * | 10/2001 | Iwamoto et al. | ............ 324/174 |
| 2003/0215168 | A1 * | 11/2003 | Krabill et al. | ............ 384/448 |
| 2005/0259900 | A1 * | 11/2005 | Bianco et al. | ............ 384/448 |

FOREIGN PATENT DOCUMENTS

| JP | 2000-162072 A | 6/2000 |
|---|---|---|
| JP | 2001-050832 | 2/2001 |
| JP | 2002-340920 A | 11/2002 |
| JP | 2004-003918 A | 1/2004 |

OTHER PUBLICATIONS

Japanese Office Action issued on Jan. 6, 2009 in corresponding Japanese Patent Application 2004-243083.

* cited by examiner

*Primary Examiner*—Richard W L Ridley
*Assistant Examiner*—James Pilkington (57) ABSTRACT

A wheel support bearing assembly includes outer and inner members rotatable relative to each other and circumferential rows of rolling elements interposed between raceway surfaces in the outer and inner members, respectively. The inner member has a hub axle having a wheel mounting flange and an inner race mounted on an inboard end of the hub axle, with the raceway surfaces defined in the inner race and the hub axle, respectively. A to-be-detected member is provided on a portion of an outer peripheral surface of the inner member, which is axially inwardly of the raceway surfaces defined in the inner race. A displacement sensor and a rotation sensor both confronting the to-be-detected member is provided in the outer member.

5 Claims, 7 Drawing Sheets

WHEEL SUPPORT BEARING ASSEMBLY

BACKGROUND OF THE INVENTION

1. Field of the Invention

The present invention generally relates to a wheel support bearing assembly that is assembled under a preloaded condition.

2. Description of the Prior Art

The wheel support bearing assemblies for rotatably supporting a vehicle wheel relative to a vehicle body structure are currently available in numerous types and are generally comprised of outer and inner members rotatable relative to each other and at least one circumferential row of rolling elements operatively interposed between the outer and inner members. Of those wheel support bearing assemblies, the wheel support bearing assembly of a third generation type is also known, in which as the inner member, an inner race is mounted externally on an inboard end of a hub axle.

In the third generation type wheel support bearing assembly, the inner race mounted on the inboard end of the hub axle is fixed in position by means of a staking portion formed in the inboard end of the hub axle. The staking portion is staked against an annular end face of the inner race to hold the inner race axially immovably relative to the hub axle to thereby apply a preload for the purpose of increasing the bearing lifetime and the bearing rigidity. In such wheel support bearing assembly, the control of the preload is generally carried out by measuring the initial axial width of the bearing assembly before the staking portion is staked and the post-staking axial width of the same after the staking portion has been staked, with the use of a dial gauge or a laser end-measuring machine and controlling the applied preload in dependence on the amount of change in width between the initial axial width and the post-staking axial width. See, for example, the Japanese Laid-open Patent Publication No. 2001-050832.

It has, however, been found that the above suggested preload controlling method has some problems. Specifically, not only must the measurement of the width of the bearing assembly be carried out twice, i.e., before and after the staking process, but the use is required of the dial gauge or laser end-measuring machine as a width measuring device. Accordingly, not only are complicated and time-consuming procedures of the measurement required, but also a relatively large variation in measurement occurs in the measurements. For this reason, the cost of measurement tends to increase and the reliability of the measured values tends to be lowered.

SUMMARY OF THE INVENTION

Accordingly, the present invention has been devised with a view to substantially eliminating the problems and inconveniences inherent in the manufacture of the prior art wheel support bearing assembly and is intended to provide a wheel support bearing assembly, in which the preload control can be accomplished at a reduced cost and with a high reliability.

In order to accomplish the foregoing object, the present invention provides a wheel support bearing assembly, for rotatably supporting a vehicle wheel relative to a vehicle body structure, including an outer member having an inner peripheral surface formed with a plurality of circumferentially extending outer raceway surfaces, an inner member having circumferentially extending inner raceway surfaces defined therein in alignment with the outer raceway surfaces in the outer member, and rows of rolling elements operatively interposed between the outer raceway surfaces in the outer member and the inner raceway surfaces in the inner member. The inner member is made up of a hub axle having a radially outwardly extending flange for securement of the vehicle wheel thereto and an inner race mounted on an inboard end of the hub axle, with the inner raceway surfaces in the inner member being defined in the inner race and the hub axle, respectively. A to-be-detected member is provided on a portion of an outer peripheral surface of the inner member, which is axially inwardly of the raceway surface defined in the inner race, and a sensor cooperable with the to-be-detected member is provided in the outer member in alignment with the to-be-detected member. The sensor referred to above may be a displacement sensor.

According to the present invention, since the to-be-detected member is provided on that portion of the outer peripheral surface of the inner member, which is axially inwardly of the raceway surface defined in the inner race, i.e., which is situated between the raceway surfaces in the inner member, and since the sensor in alignment with the to-be-detected member is provided in the outer member, the measurement can be carried out in the following manner particularly where the displacement sensor is employed for the sensor referred to above.

More specifically, during the mounting of the inner race onto the hub axle, the amount of displacement of an axial gap between the to-be-detected member and the displacement sensor, which takes place between an initial stage of the mounting and completion of the mounting, can be detected by the displacement sensor. Based on the amount of displacement so detected, the amount of a preload to be applied to the bearing assembly can be measured by conversion. For this reason, a highly reliable preload control can be accomplished at a reduced cost with no need to employ any expensive and complicated measuring instrument.

Where the displacement sensor is used for detecting a load imposed on the vehicle wheel, this displacement sensor can be concurrently employed for detection of the load on the vehicle wheel and also for detection of the amount of the preload. As such, the amount of the preload can be detected without any dedicated measuring instrument used and, therefore, the preload control can advantageously be accomplished at a further reduced cost.

It is to be noted that the sensor to be positioned in alignment with the to-be-detected member may not be always limited to the displacement sensor, but any sensor can be employed in the practice of the present invention provided that it can achieve a preload measurement.

In one preferred embodiment of the present invention, the hub axle may have an inner race mount defined in an outer periphery of the inboard end of the hub axle. The inner race is mounted and fixed axially immovably on the inner race mount by means of a staking portion protruding outwardly from the inner race mount towards an inboard side. While fixture of the inner race on the inner race mount by means of staking is generally employed as a simple fixing method for the inner race, even in this case, the provision of the to-be-detected member on that portion of the outer peripheral surface of the inner member, which is axially inwardly of the raceway surface defined in the inner race, and the concomitant provision of the sensor in alignment with the to-be-detected member in the outer member make it possible to accomplish a highly reliable preload control at a reduced cost.

In another preferred embodiment of the present invention, the to-be-detected member may be an annular member having a cylindrical wall and a flange protruding radially outwardly from the cylindrical wall. The cylindrical wall is mounted on the inner race. A magnetic encoder for detecting the number of revolutions may be provided on the cylindrical wall, while the flange may be an iron member for detection of the displacement.

In such case, the only to-be-detected member can be concurrently used for detection of the amount of the preload and also for detection of the number of revolutions.

In a further preferred embodiment of the present invention, the to-be-detected member may be held in a non-contact relation with the hub axle. The non-contact feature of the to-be-detected member relative to the hub axle is effective to increase the detection sensitivity of displacement of the inner race caused by the load applied to the inner race and, accordingly, the amount of the preload can be measured with high precision.

The to-be-detected member may be prepared from an iron plate by means of a press work. The use of the press-worked product for the to-be-detected member makes it possible to construct the to-be-detected member simply and inexpensively.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

With reference to FIGS. 1 to 5, a first preferred embodiment of the present invention will be described. A wheel support bearing assembly according to this first embodiment is an inner race rotating model of a third generation type and is shown as applied for supporting a drive wheel of an automotive vehicle. It is to be noted that the terms, "outboard" and "inboard", hereinabove and hereinafter used in this specification are intended to represent the sides facing the outside and inside of the vehicle, respectively. So far shown in FIG. 1, left and right portions of the drawing sheet represent outboard and inboard sides, respectively.

Figure 1:
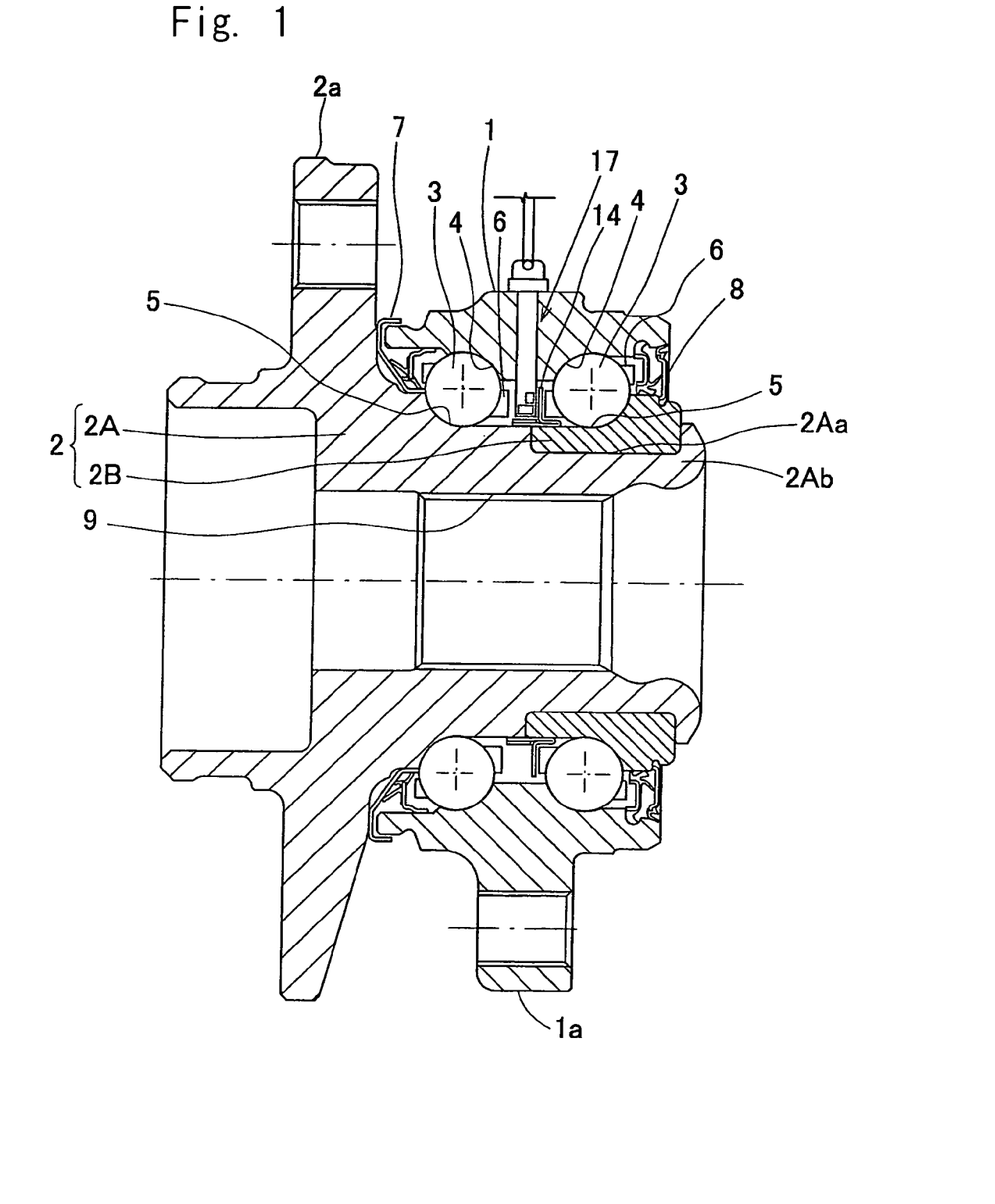
FIG. 1 is a longitudinal sectional view of a wheel support bearing assembly according to a first preferred embodiment of the present invention.

Referring to FIG. 1, the wheel support bearing assembly includes an outer member 1 having an inner peripheral surface formed with a plurality of axially spaced inboard and outboard raceway surfaces 4, an inner member 2 positioned inside the outer member 1 and having an outer peripheral surface formed with axially spaced inner inboard and outboard raceway surfaces 5 in alignment with the respective inboard and outboard raceway surfaces 4, and circumferentially extending rows of rolling elements 3, the rolling elements 3 of each row being accommodated operatively within an annular bearing space delimited between the outer and inner members 1 and 2 and rollingly received in part within the corresponding raceway surface 4 and in part within the corresponding raceway surface 5.

The wheel support bearing assembly in the illustrated embodiment is represented by a dual-row angular ball bearing, in which the outer and inner raceway surfaces 4 and 5 represent a generally arcuate sectional shape and have a respective contact angle to form a back-to-back relation. The rolling elements 3 employed are in the form of a ball and are operatively retained in position by a ball retainer 5.

The outer member 1 serves as a stationary member and is of one-piece construction including a vehicle-body fitting flange 1a extending radially outwardly from an outer peripheral surface of the outer member 1, as shown in FIG. 1, and fixed to a knuckle (not shown). The body fitting flange 1a is fastened to the knuckle, provided in the vehicle body structure (not shown), by means of a circumferentially spaced fastening bolts (now shown).

The inner member 2 serves as a rotatable member and includes a hub axle 2A having an outer peripheral surface formed with a radially outwardly extending wheel mounting flange 2a, and a separate inner race 2B firmly mounted on an inboard end of the hub axle 2. The inboard and outboard raceway surfaces 5 are defined in respective outer peripheral surfaces of the inner race 2B and the hub axle 2A. The inner race 2B is press-fitted to an inner race mount 2Aa defined in an outer peripheral surface of the inboard end of the hub axle 2A and firmly fixed in position by means of a staking portion 2Ab, protruding axially outwardly from the inner race mount 2Aa of the hub axle 2A in a direction towards the inboard side, which portion 2Ab is staked radially outwardly to contact an inboard-side end face of the inner race 2B to thereby hold the inner race 2B in position axially immovably in the inner race mount 2Aa. Accordingly, the bearing assembly is given a preload to increase the bearing lifetime and the bearing rigidity.

The hub axle 2A has an axially extending center bore 9 defined therein and is drivingly coupled with a constant velocity universal joint. Specifically, the constant velocity universal joint has a stem (now shown) formed integrally with an outer race of the universal joint and is drivingly coupled with the hub axle 2A for rotation together therewith with the stem fixedly engaged in the center bore 9 in the hub axle 2A. The annular bearing space delimited between the outer and inner members 1 and 2 has outboard and inboard open ends opposite to each other, which are sealed by contact-type outboard and inboard sealing members 7 and 8, respectively.

A portion of the wheel support bearing assembly of the structure described above is shown on an enlarged scale in FIG. 2. As shown therein, a portion of the outer peripheral surface of the inner race 2B axially inwardly of the bearing assembly, specifically on one side of the inboard row of the rolling elements 3 remote from the inboard sealing member 8, has a to-be-detected member 14 firmly mounted thereon. This to-be-detected member 14 is an annular member prepared from an iron plate by the use of any known press work and including a cylindrical wall 14a and an annular flange 14b protruding radially outwardly from one end of the cylindrical wall 14a.

Figure 2:
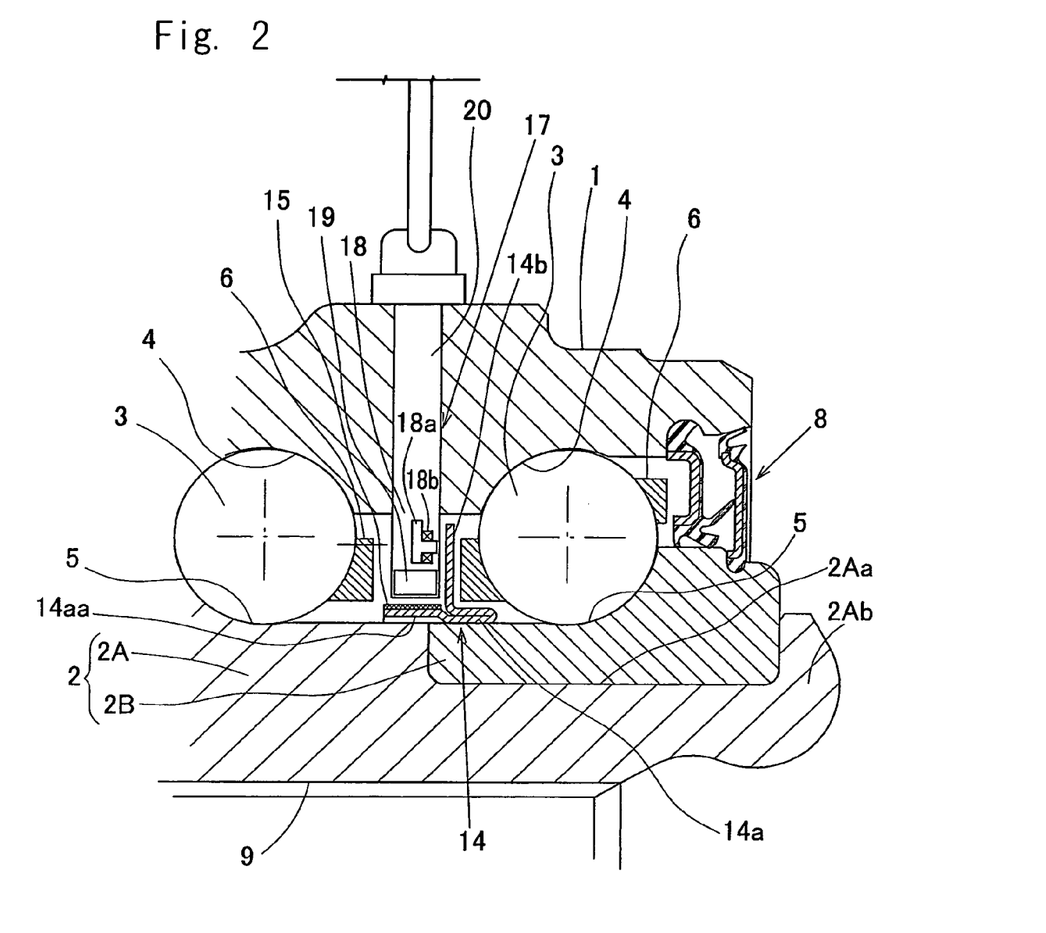
FIG. 2 is a fragmentary longitudinal sectional view, showing a portion of the wheel support bearing assembly on an enlarged scale.

The to-be-detected member 14 is mounted on that portion of the outer peripheral surface of the inner race 2B with the cylindrical wall 14a thereof held in tight contact with the outer peripheral surface of the inner race 2B. The cylindrical wall 14a is of a folded configuration to define a double walled portion including an inner layer and an outer layer. The inner layer of the cylindrical wall 14a is mounted on the outer peripheral surface of the inner race 2B. The flange 14b extends radially outwardly from one end of the outer layer of the cylindrical wall 14a. The inner layer of the cylindrical wall 14a, positioned radially inwardly of the outer layer thereof, extends further axially in a direction towards the outboard row of the rolling element 3 to define an axial extension 14aa.

This axial extension 14aa has an inner diameter slightly greater than that of the inner layer of the cylindrical wall 14a held in contact with the outer peripheral surface of the inner race 2B. When the to-be-detected member 14 is mounted on that portion of the inner race 2B, the axial extension 14aa comes to a position radially outwardly of, and overlies, a portion of the hub axle 2A without contacting that portion of the hub axle 2A. As hereinabove described, the to-be-detected member 14 is of a generally inverted T-sectioned configuration with the multi-folded portions and can be readily and inexpensively manufactured from an iron plate by any know press work.

Figure 3:
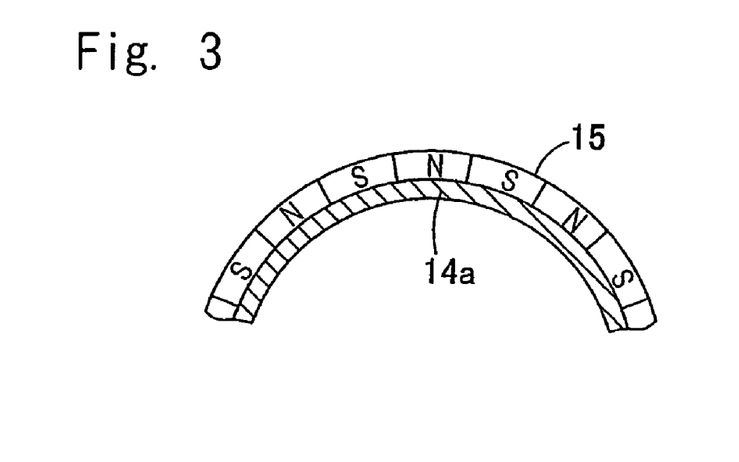
FIG. 3 is a fragmentary sectional view of a portion of an magnetic encoder employed in the wheel support bearing assembly.

A magnetic encoder 15 cooperable with a rotation sensor 19, as will be described later, to detect the number of revolutions is fixedly mounted on an outer peripheral surface of the axial extension 14aa. On the other hand, the flange 14b is used as a to-be-detected region that is detected by a displacement sensor 18 as will be described subsequently. The magnetic encoder 15 is in the form of an annular magnet having a plurality of opposite magnetic poles N and S alternating with a uniform pitch in a direction circumferentially thereof.

Referring to FIG. 2, the rotation sensor 19 and the displacement sensor 18 are encapsulated in a resinous molding and are hence integrated together to form a generally elongated sensor unit 17. This sensor unit 17 is inserted into and fixed within a radial through-hole 20 defined in the outer member 1 and is positioned between the inboard and outboard raceway surfaces 4 and 4 in the outer member 1. The displacement sensor 18 is oriented axially towards the flange 14b of the to-be-detected member 14 and the rotation sensor 19 is oriented radially inwardly towards the magnetic encoder 15.

Specifically, the sensor unit 17 within the through-hole 20 has a radial inward end protruding outwardly from the inner peripheral surface of the outer member 1. The rotation sensor 19 and the displacement sensor 18 are arranged in this radial end and are positioned in proximity of the axial extension 14aa of the to-be-detected member 14 and the flange 14b of the same to-be-detected member 14. The radial through-hole 20 for accommodating the sensor unit 17 is provided with at least one or more sealing elements such as an O-ring (not shown) to avoid an ingress of water and/or oil from the through-hole 20 into the annular bearing space.

The displacement sensor 18 is of, for example, a reluctance type, in which a coil 18b is wound around a yoke 18a and is used to detect a change of an axial gap between the flange 14b of the to-be-detected member 14 and the displacement sensor 18. On the other hand, the rotation sensor 18 is in the form of a magnetic sensor, for example, a Hall element or a magnetoresistance element and is used to detect a change in magnetism of the magnetic encoder 15 that rotates together with the inner member 2.

Figure 4:
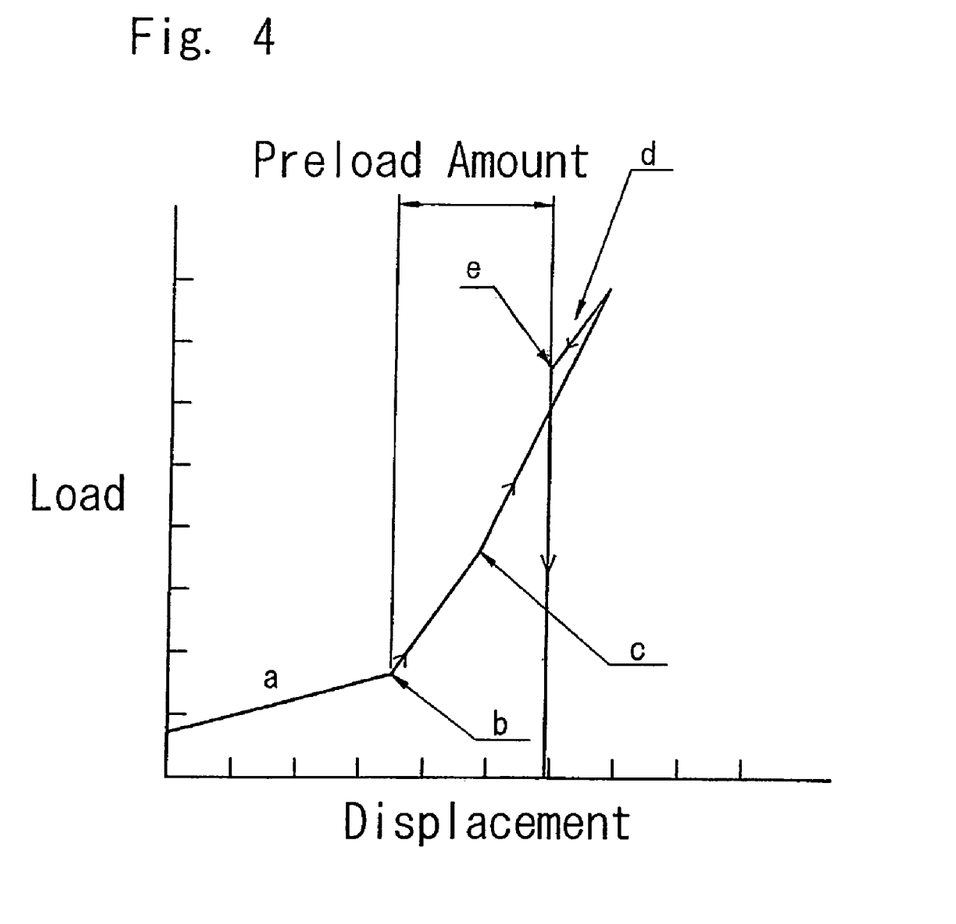
FIG. 4 is a chart showing the relation between the displacement of an inner race and the staking load during the mounting of the inner race onto a hub axle of the wheel support bearing assembly.
Figure 5:
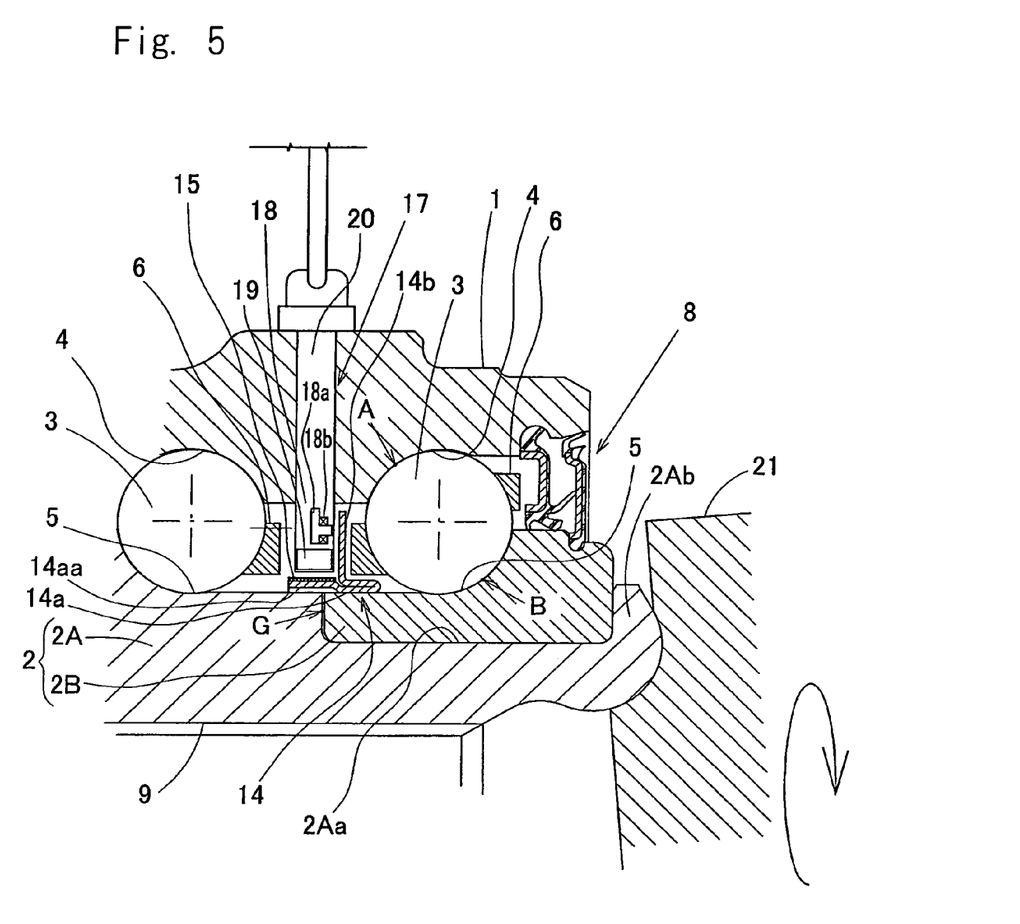
FIG. 5 is a fragmentary longitudinal sectional view of that portion of the wheel support bearing assembly, showing a staking process employed to fix the inner race in position on the hub axle.
Figure 6:
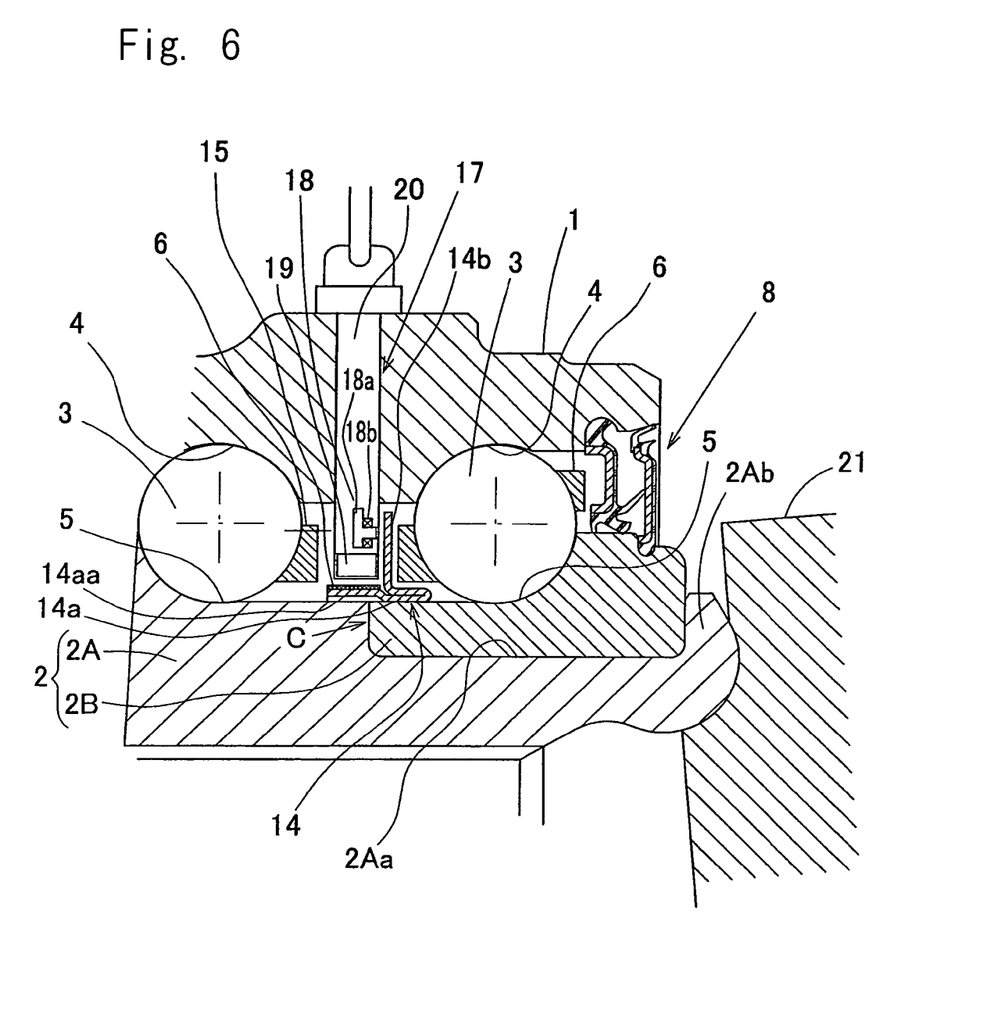
FIG. 6 is a view similar to FIG. 5, showing the staking process completed.

FIG. 4 illustrates the relation between the displacement and the preload during the assemblage of the wheel support bearing assembly. During the assemblage, as shown in FIGS. 5 and 6, the inner race 2B is press-fitted on the inner race mount 2Aa in the hub axle 2A forming a part of the inner member 2 and the staking portion 2Ab of the hub axle 2A is staked to fix the inner race 2B in position by the use of a suitable staking jig 21. FIG. 4 illustrates the relation between the load applied to the inner race 2B and the amount of displacement of the inner race 2B during the press-fitting process.

Referring to FIG. 4, the axis of ordinates represents the load acting on the inner race 2B, whereas the axis of abscissas represents the amount of displacement of the inner race 2B. At an initial stage of press-fitting of the inner race 2B onto the hub axle 2A (prior to the row of the rolling elements 3 being brought into contact with the outer and inner raceway surfaces 4 and 5), the load applied to the inner race 2B is small as shown by a line segment a in FIG. 4. When the row of the rolling elements 3 starts contacting the outer and inner raceway surfaces 4 and 5 as shown in FIG. 5 (the points of contact being shown by A and B in FIG. 5), the load applied to the inner race B abruptly increases as shown in a right-hand area of the chart of FIG. 4 starting from a point B.

At this time, an axial gap G is present between the annular end face of the inner race 2B and the hub axle 2A as shown in FIG. 5. As the load on the inner race 2B increases, the annular end face of the inner race 2B is brought into contact with the hub axle 2A as shown by C in FIG. 6 (which corresponds to a point c in FIG. 4).

Further increase of the load and subsequent removal of the staking load, which takes place after the inner race B has been applied an intended load or staked to a push-in position in which the inner race 2B is pushed to the predetermined position, result in the inner race 2B being returned somewhat from the push-in position back to a final position e in FIG. 4, at which the load is relieved from the inner race 2B, by the effect of an elastic deformation as shown by line segments d in FIG. 4.

In this staking process, the distance (the amount of the preload) from the point b to the position e in the graph shown in FIG. 4 is measured by the displacement sensor 18 as a change of the axial gap between the flange 14b of the to-be-detected member 14 and the displacement sensor 18. When this measured value is converted into a load, the amount of the preload applied to the wheel support bearing assembly during the assemblage thereof can be measured. According to the present invention, no complicated and expensive measuring instrument such as, for example, a dial gauge or a laser end-measuring machine needs to be used during the measurement and, accordingly, the highly reliable preload control can be accomplished at a low cost. During this measurement, the to-be-detected member 14 is held in a non-contact relation with the hub axle 2A and, therefore, the sensitivity of the displacement of the inner race 2B relative to the load applied to the inner race 2B is so high that the amount of the preload can be measured with high precision.

Also, since during the rotation of the inner member 2 together with the vehicle wheel the rotation sensor 19 detects a change in magnetic characteristic of the magnetic encoder 15 in the to-be-detected member 14, a detection signal outputted from the rotation sensor 19 can be utilized to detect the number of revolutions of the vehicle wheel. In other words, the sole to-be-detected member 14 can be concurrently used for the detection of the amount of the preload and also for the detection of the number of revolutions.

The displacement sensor 18 may be employed to detect an axial load acting on the vehicle wheel during the cornering of the automotive vehicle. In such case, the displacement sensor 18 while the wheel support bearing assembly is utilized in the automotive vehicle can be concurrently used for the measurement of the amount of the preload. For this reason, the amount of the preload can be measured without any dedicated instruments used for that purpose and, therefore, the preload control can advantageously be accomplished at a further reduced cost.

Figure 7:
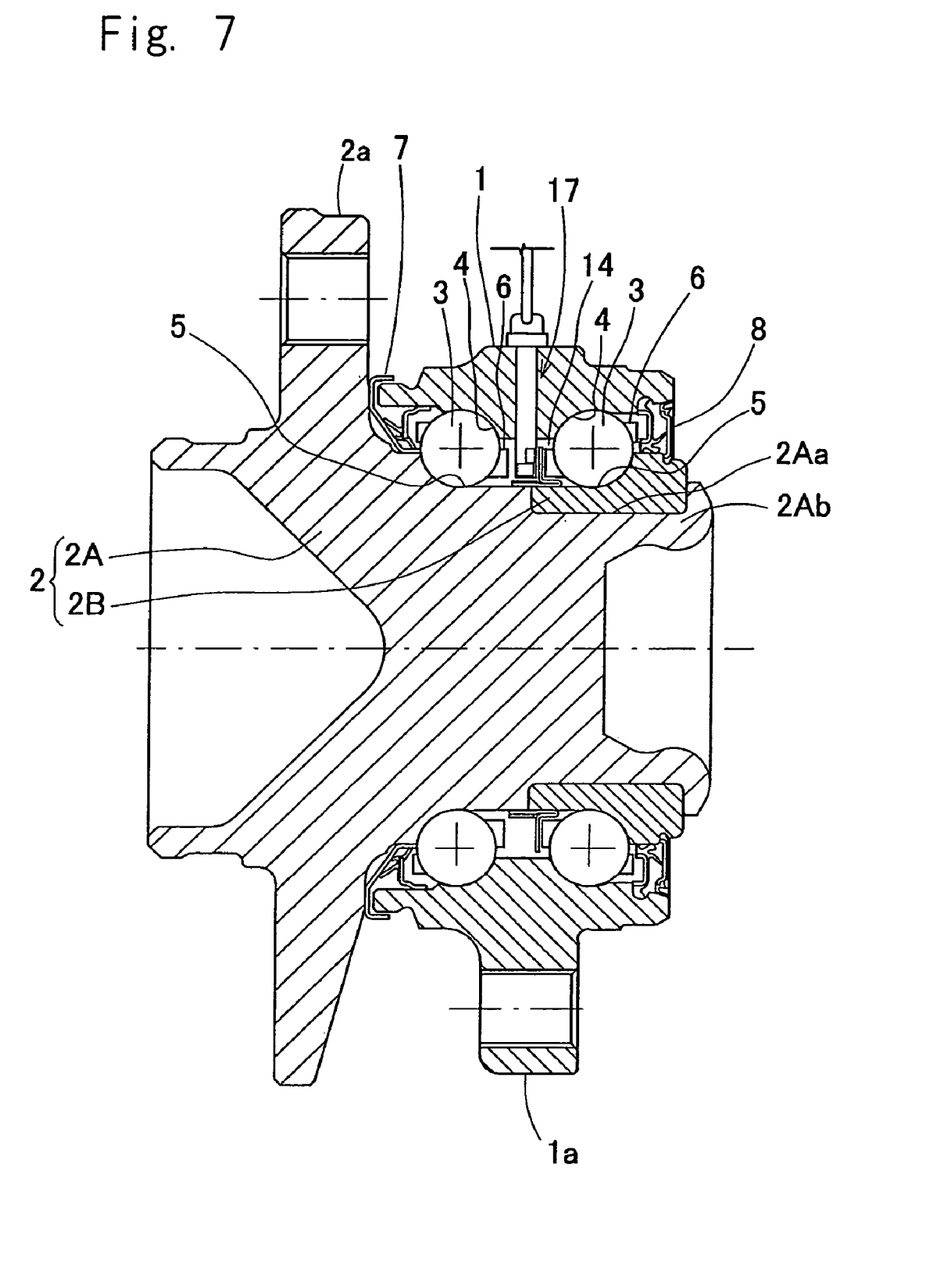
FIG. 7 is a longitudinal sectional view of the wheel support bearing assembly according to a second preferred embodiment of the present invention.

FIG. 7 illustrates a second preferred embodiment of the present invention. The wheel support bearing assembly according to this second embodiment is in the form of a dual row angular ball bearing of an inner race rotating model of a third generation type, but is used to support a vehicle driven wheel in contrast to the vehicle drive wheel supported by the wheel support bearing assembly of the structure shown and described with reference to FIGS. 1 to 6. In this embodiment, the hub axle 2A is not coupled with the outer race of the constant velocity universal joint and, therefore, has no center bore such as shown by 9 in the first embodiment. Except for the lack of the center bore, other structural features of the wheel support bearing assembly shown in FIG. 7 are substantially identical to those of the wheel support bearing assembly in FIGS. 1 to 6 and, therefore, the details thereof are not reiterated for the sake of brevity.

Figure 8:
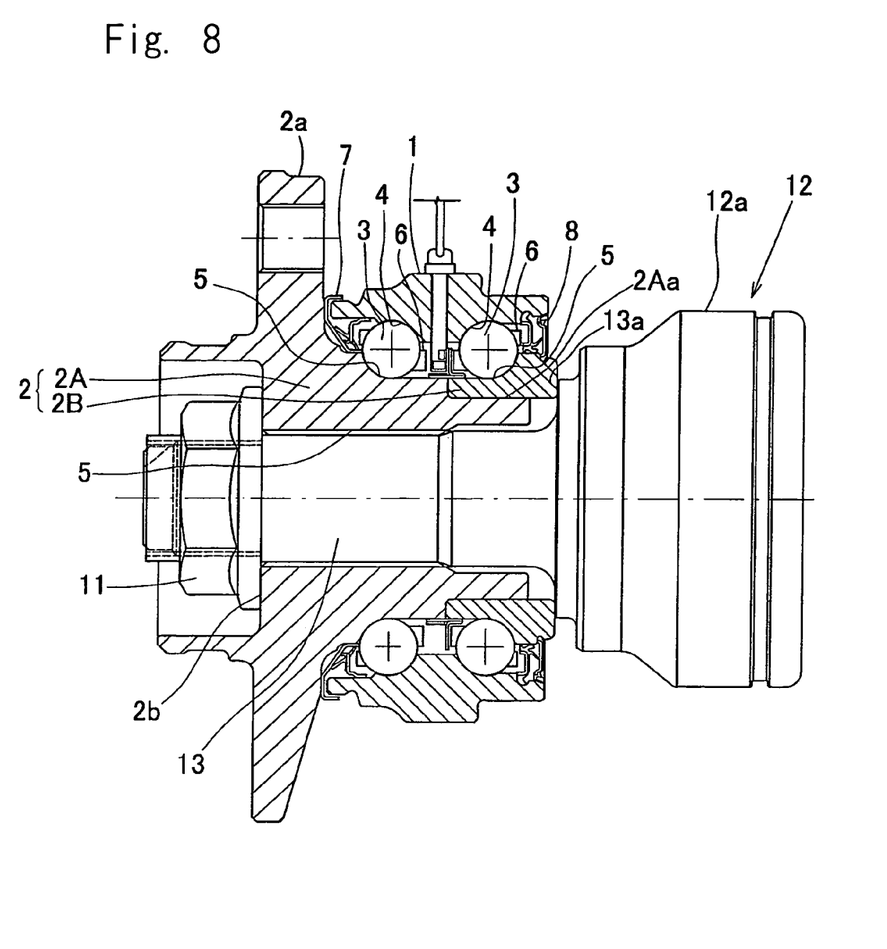
FIG. 8 is a longitudinal sectional view of the wheel support bearing assembly according to a third preferred embodiment of the present invention.

FIG. 8 illustrates a third preferred embodiment of the present invention. The wheel support bearing assembly of this third embodiment is substantially similar to that of the first embodiment, except that in this third embodiment a stem 13 of the outer race 12a of the constant velocity universal joint, which is inserted into and splined to the center bore 9 in the hub axle 2A, has a nut member 11 fastened thereto to firmly connect the constant velocity universal joint with the hub axle 2A. More specifically, with the nut member 11 engaged against an end face 2b of the center bore 9, the outer race 12a of the constant velocity universal joint is urged against the hub axle 2A in the outboard direction to accomplish a firm connection between the hub axle 2A and the constant velocity universal joint. When a stepped face 13a of the free base of the stem 13 of the outer race 12a is urged against the end face of the inner race 2B as a result of the fastening of the nut member 11, the inner race 2B is firmly fastened axially immovable relative to the hub axle 2A. In this way, the preload is applied to the wheel support bearing assembly.

Other structural features of the wheel support bearing assembly shown in FIG. 8 are substantially identical to those of the wheel support bearing assembly in FIGS. 1 to 6 and, therefore, the details thereof are not reiterated for the sake of brevity.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A wheel support bearing assembly to rotatably support a vehicle wheel relative to a vehicle body structure, comprising:
an outer member having an inner peripheral surface formed with a plurality of circumferentially extending outer raceway surfaces;
an inner member having circumferentially extending inner raceway surfaces defined therein in alignment with the outer raceway surfaces in the outer member; and
rows of rolling elements operatively interposed between the outer raceway surfaces in the outer member and the inner raceway surfaces in the inner member,
wherein the inner member includes a hub axle having a radially outwardly extending flange for securement of the vehicle wheel thereto and an inner race mounted on an inboard end of the hub axle, with the inner raceway surfaces in the inner member being defined in the inner race and the hub axle, respectively,
wherein a to-be-detected member is provided on a portion of an outer peripheral surface of the inner member, which is between the raceway surfaces defined in the inner race and the hub axle, and sensors cooperable with the to-be-detected member are provided in the outer member in alignment with the to-be-detected member, the sensors being a rotation sensor and a displacement sensor,
wherein the to-be-detected member is in the form of an annular member having a cylindrical wall with a magnetic encoder mounted thereon to detect rotation, the cylindrical wall being mounted on the outer peripheral surface of the inner race, and a flange protruding radially outwardly from the cylindrical wall, and
wherein the displacement sensor detects a change of an axial gap between the flange of the to-be-detected member and the displacement sensor.

2. The wheel support bearing assembly as claimed in claim 1, wherein the hub axle has an inner race mount defined in an outer periphery of an inboard end portion thereof and the inner race is mounted and fixed axially immovably on the inner race mount by means of a staking portion protruding outwardly from the inner race mount towards an inboard side.

3. The wheel support bearing assembly as claimed in claim 1, wherein the flange of the to-be-detected member is an iron member.

4. The wheel support bearing assembly as claimed in claim 1, wherein the to-be-detected member is held in a non-contact relation to the hub axle.

5. The wheel support bearing assembly as claimed in claim 1, wherein the to-be-detected member is prepared from an iron plate by means of a press work.

* * * * *